United States Patent [19]

Leventis et al.

[11] Patent Number: 4,866,295

[45] Date of Patent: Sep. 12, 1989

[54] POWER SUPPLY CONTROL SYSTEMS

[75] Inventors: Chris Leventis, South Harrow; Brian J. Pollard, Watford, both of United Kingdom

[73] Assignee: Case Group P.l.c., Watford, United Kingdom

[21] Appl. No.: 182,238

[22] Filed: Apr. 15, 1988

[30] Foreign Application Priority Data

Apr. 16, 1987 [GB] United Kingdom ................. 8709283

[51] Int. Cl.[4] ................................................ H02J 1/04

[52] U.S. Cl. ........................................ 307/43; 307/52; 307/53; 307/66; 307/87; 307/60; 323/907; 363/71; 363/81

[58] Field of Search ........................ 307/42, 43, 44, 45, 307/46, 47, 48, 49, 50, 51, 52, 53, 54, 55, 56, 57, 58, 59, 60, 61, 62, 63, 64, 65, 66, 82, 83, 84, 85, 86, 87

[56] References Cited

U.S. PATENT DOCUMENTS

| | | | |
|---|---|---|---|
| 4,012,685 | 3/1977 | Nercessian | 307/48 X |
| 4,207,475 | 6/1980 | Nercessian | 307/52 |
| 4,609,828 | 9/1986 | Small | 307/44 |
| 4,618,779 | 10/1986 | Wiscombe | 307/60 |
| 4,635,178 | 1/1987 | Greenhalgh | 307/58 X |
| 4,748,340 | 5/1988 | Schmidt | 307/53 |
| 4,754,161 | 6/1988 | Fox | 307/66 X |

FOREIGN PATENT DOCUMENTS

| | | |
|---|---|---|
| 1411259 | 10/1975 | United Kingdom . |
| 2122776 | 1/1984 | United Kingdom . |

*Primary Examiner*—William M. Shoop, Jr.
*Assistant Examiner*—Paul Ip
*Attorney, Agent, or Firm*—Saidman, Sterne, Kessler & Goldstein

[57] ABSTRACT

A power supply control system controls at least two variable power supplies feeding a common load connected to a common output terminal. A sensor monitors the current drawn by each power supply in dependence upon the difference detected in a sense to reduce the difference to zero. A summing circuit sums the outputs of all the comparators. Another comparator compares the output of the summing circuit with a zero level and produces an output to modify the reference signal. The loops comprising each comparator and the further comparator each act in a sense to reduce the output of the summing circuit to zero and in this way the system tends to maintain a balanced output from all supplies so that each supply shares the power requirement of the load according to its capacity while at the same time maintaining the output voltage at a level corresponding to the average of the nominal voltages of the individual supplies.

12 Claims, 2 Drawing Sheets

POWER SUPPLY CONTROL SYSTEMS

BACKGROUND OF THE INVENTION

1. Field of the Invention

The present invention relates to power supply control systems for controlling two or more power supplies coupled to a common load.

2. Description of the Prior Art

In a previously proposed arrangement the outputs from two individual power supplies are connected to supply a common load with power. This is done to feed the load with more current than a single power supply can provide or to provide a back-up in the event that one of the two power supplies fails.

When constant voltage DC power supplies are used and because of the tolerances to which power supplies are manufactured, the precise output voltages of the two supplies will rarely be exactly the same. As a result when the two power supplies are connected to a common load the supply with the marginally higher output voltage will tend to supply the lion's share of current, leaving the other power supply virtually idle.

Such a condition is undesirable since the power supply with the slightly higher output voltage will tend to operate at the limit of its capacity and so will be subject to greater stress and therefore liable to earlier failure. Also because the other power supply tends to be idle it is difficult to detect when it fails until it is called upon to take over from the active power supply at which time it is too late to take corrective action.

Furthermore if the active power supply fails then 100% of the load is immediately transferred to the idle supply. This is likely to cause a significant transient effect on the output voltage during the change-over period and thus is undesirable. Such transient effects are significantly reduced if both supplies share 50% load prior to one supply failing and during the subsequent transfer of the 50% load to the remaining supply.

It is an object of the present invention to provide an improved power supply control system.

SUMMARY OF THE INVENTION

According to the present invention there is provided a power supply control system for controlling a plurality of variable power supplies feeding a common load, the system comprising for each power supply; sensing means for sensing the current drawn from the power supply, and comparison means for comparing the output of the sensing means with a first reference signal and providing an output to control the power supply in dependence thereon, the system further comprising means for combining the output of each comparison means, reference means providing a second reference signal and further comparison means for comparing the output of the combining means with the second reference signal to modify said first reference signal, the system acting in a sense to reduce the difference between the output of the combining means and the second reference signal and the output of each sensing means and the first reference signal substantially to zero.

According to the present invention there is further provided a power supply control system for controlling a plurality of variable power supplies feeding a common load, the system comprising for each power supply, control means having two feedback loops, a first loop for comparing the current drawn by the corresponding power supply with a function of all the currents drawn by all the supplies and producing an error signal for controlling the corresponding power supply in dependence thereon, and a second loop for comparing the error signal with a function of all the error signals produced by the control means and for modifying the error signal produced in dependence thereon.

BRIEF DESCRIPTION OF THE DRAWINGS

Power supply control systems embodying the present invention will now be described, by way of example, with reference to the accompanying diagrammatic drawings which shows a circuit diagram of the power supply control system.

DESCRIPTION OF THE PREFERRED EMBODIMENTS

Figure 1:
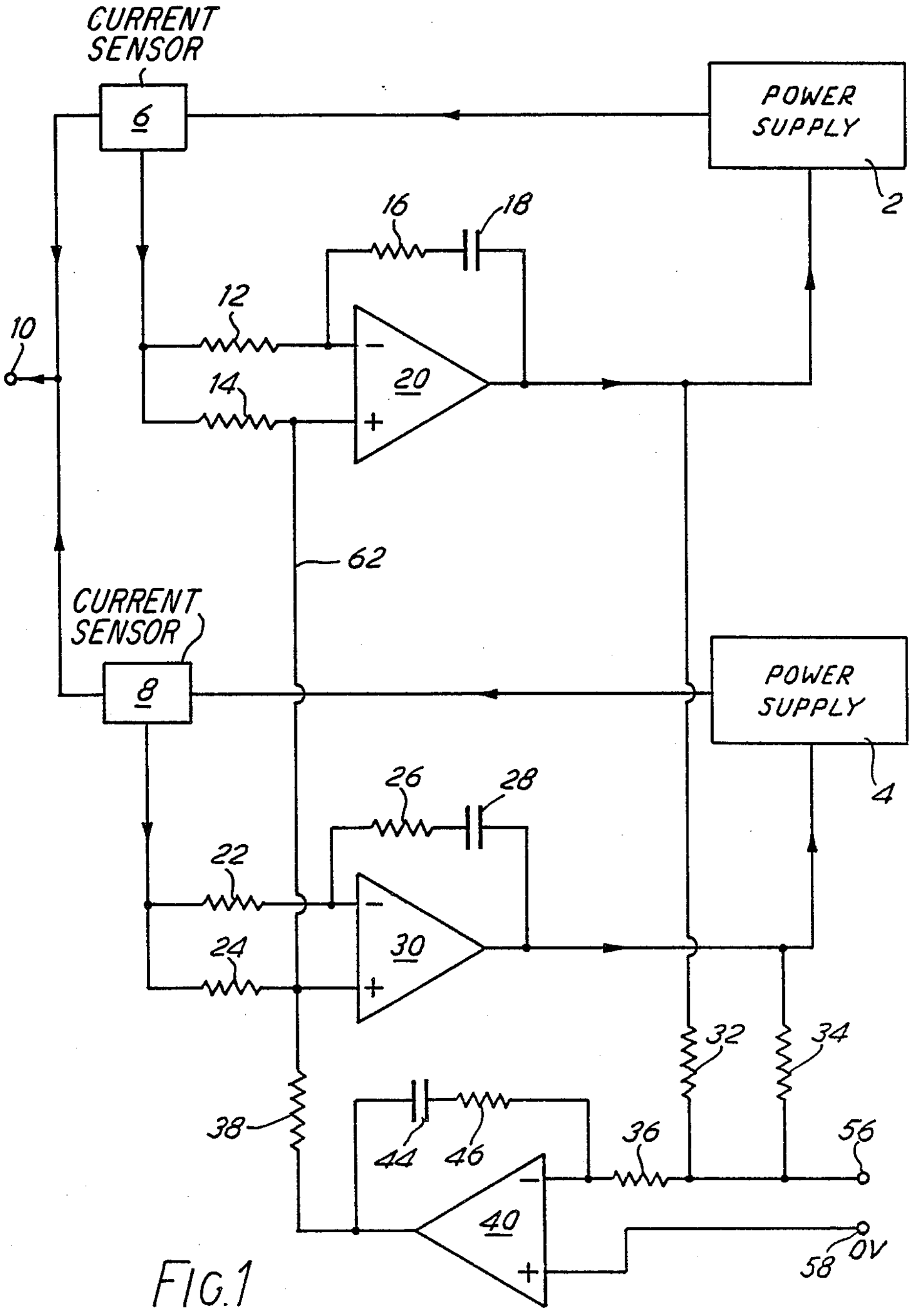
FIG. 1 shows a power supply control system.

The system shown in the drawing has first and second power supplies 2 and 4 connected to a common output terminal 10 supplying a load (not shown). The current supplied to the output terminal 10 by each power supply 2 and 4 is monitored by a respective current sensor 6 and 8. Each power supply 2 and 4 has a respective control input for controlling the output voltage of the power supplies 2 and 4.

An operational amplifier 20 has an output which varies positively and negatively about a zero level and is connected to the control input of the power supply 2. The positive and negative inputs of the operational amplifier 20 are connected via respective resistors 12 and 14 to the output of the current sensor 6. A feedback path between the output and the negative input of the operational amplifier 20 is formed by the series combination of a resistor 16 and capacitor 18.

The power supply 4 is controlled in a similar way, namely, the output of an operational amplifier 30 is connected to the control input of the power supply 4. The positive and negative inputs of the operational amplifier 30 are connected via respective resistors 24 and 22 to the output of the current sensor 8. A feedback path between the output and the negative input of the operational amplifier 30 is formed by the series combination of a resistor 26 and a capacitor 28.

The positive inputs of the two operational amplifiers 20 and 30 are coupled to a common line 62. The output of an operational amplifier 40 is coupled to the line 62 by a resistor 38. The positive input of the operational amplifier 40 is connected to a terminal 58 fed with zero voltage The negative input of the operational amplifier 40 is connected to a combining or summing circuit consisting of resistors 32, 34 and 36. The resistor 36 has one end connected to the negative input of the operational amplifier 40 while the other end of the resistor 36 is connected to a terminal 56, to the output of the amplifier 20 through the resistor 32 and to the output of the amplifier 30 through the resistor 34. The series combination of a capacitor 44 and a resistor 46 is connected to between the negative input and the output of the amplifier 40 to define a feedback path.

In operation when a load (not shown) is coupled to the output terminal 10 and the power supplies 2 and 4 are switched ON current will flow from each supply to the terminal 10. The current level passed by each supply 2 and 4 is detected by the current sensors 6 and 8 which in turn generate voltage signals proportional to the amounts drawn. The average of these two voltages is coupled by the resistors 14 and 24 to the common line 62 and hence to the positive inputs of the two amplifiers 20 and 30. The voltage produced by the sensor 6 is also communicated to the negative input of the amplifier 20 and the amplifier 20 responds to the voltage difference across its input terminals to generate a control voltage to control the power supply 2 accordingly. Similarly the voltage produced by the sensor 8 is communicated to the negative input of the amplifier 30 which responds to the voltage across its input terminals and produces an output voltage to control the power supply 4 accordingly.

The feedback path across the amplifier includes the series combination of a capacitor and a resistor and so under steady state DC conditions the feedback path is effectively open loop. Any slight variation in the relative values of the currents drawn by the power supplies will produce a transient voltage across the input terminals of the amplifiers 20 and 30 which will bring the feedback loops into operation until steady state conditions have again resumed.

Effectively the two amplifiers 20 and 30 act as error amplifiers to provide very sharp corrective output voltages in response to very small variations in input voltages (variations as small as one tenth of a millivolt).

Equilibrium conditions are reached when the voltages at all four input terminals of the amplifiers are equal.

A problem which arises with such an arrangement is that with operational amplifiers, particularly low-cost ones, there is an inherent defect which manifests itself in an offset voltage existing between the positive and negative terminals particularly when the amplifier is operating in a state in which its output voltage is mid-way between the extremes of its range.

To illustrate the nature of the problem it will be assumed that both amplifiers are offset. Now if as a result of the amplifier 20's offset the output of the current sensor becomes positive with with respect to the common voltage on line 62 then current will flow through the resistor 14 to tend to make the voltage on line 62 more positive. If amplifier 30 has an offset in the same sense then the current sensor 8 will cause a current to flow through resistor 24 to make the line 62 even more positive still.

The line 62 becomes more and more positive and only ceases to increase in voltage when the current flowing through the resistor 14 equals the current flowing through the resistor 24. This situation can only occur when one of the amplifiers enters a non-linear region of its characteristic i.e. becomes saturated. When this occurs, the power supply associated with the saturated amplifier will be operating at maximum output voltage and the output from the other power supply will move to that level needed to sustain the balance.

The provision of the operational amplifier 40 controlling the voltage on line 62 enables all offset currents through resistors 14 and 24 to be cancelled by virtue of the current it imposes upon the line 62.

The summing circuit consisting of the resistors 32, 34 and 36 will sum and/or average the voltages at the outputs of the amplifiers 20 and 30. The amplifier 40 compares the sum of the voltages with 0 volts and imposes an output current on the line 62 having a level such that it will tend to bring the sum of the outputs from the amplifiers 20 and 30 to zero. The effect of the feedback circuit consistig of the resistor 46 and the capacitor 44 means that transient variations in the sum of the output voltages are effectively ignored. Low frequency variations produce a strong controlling action, and for DC signals the feedback path is open loop, providing the strongest controlling action.

The effect of the operational amplifier is two-fold. On the one hand it prevents either of the amplifiers 20 and 30 being driven into saturation by the cumulative effect of the offset, and on the other hand because the sum of both the output voltages from the amplifiers 20 and 30 must be zero it ensures that they operate in a more balanced manner relative to one another, that is they control their power supplies so that the power supplies both operate at the average of their nominal output voltages while simultaneously by the action of amplifiers 20 and 30 they operate at substantially the same percentage of their maximum capacity. This of course assumes that the two power supplies are of equal capacity. If the power supplies do not have equal capacities then the current sensors 6 and 8 are scaled in accordance with the capacity of the power supply which each monitors. This means that each sensor 6 and 8 will have the same range of output voltage variation (e.g. 0 to 1 volt) regardless of the capacity of its corresponding power supply. This ensures that the load is shared by the supplies in a balanced manner, that is in proportion to their capacities. Thus for example if one power supply is operating at 50% of its capacity then under steady state conditions the other power supply will also operate at 50% of its capacity.

Figure 2:
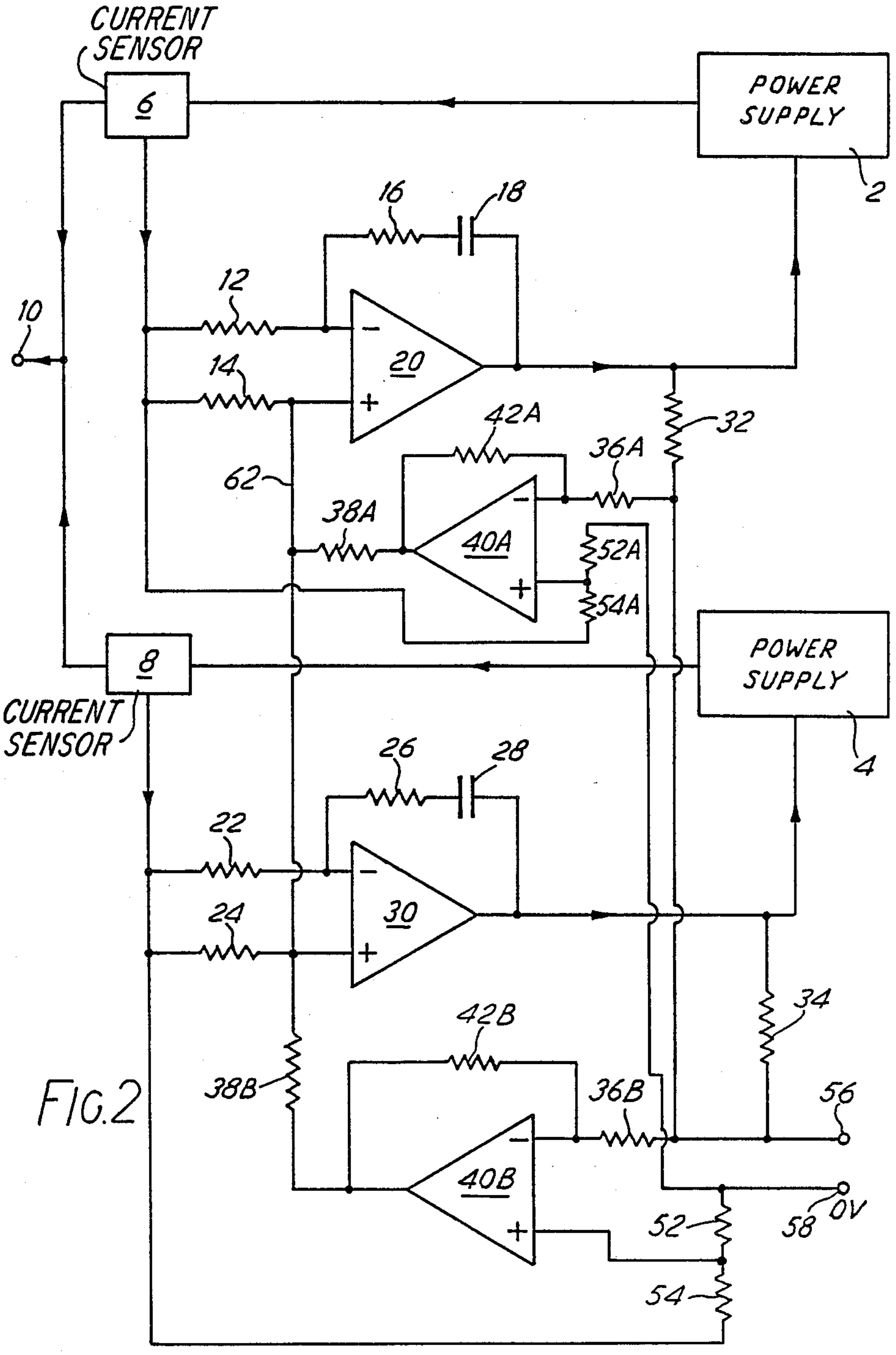
FIG. 2 shows another embodiment of a power supply system.

FIG. 2 shows a modified control system in which the control circuit for each power supply is modularised so that the control circuits are interchangeable and do not rely upon any common elements for operation.

In FIG. 2 parts similar to those in FIG. 1 are similarily referenced. Thus as shown the amplifier 20 is associated with an amplifier 40*a* and the amplifier 30 is associated with an amplifier 40*b*.

The amplifier 40*a* has its negative input connected to the terminal 56 at which the error signals from the amplifiers 20 and 30 are summed. A feed back loop between the negative input an the output of the amplifier 40*a* is defined by a resistor 42*a* which provides the amplifier with a reduced gain for DC signals (for example a gain of 60). This limited gain is still enough to ensure that the effects of amplifier offsets are greatly reduced and still ensures that the summed voltage appearing at limited 56 remains close to zero.

A potential divider consisting of series connected resistors 42*a* and 54*a* spans the terminal 58 and the output of the sensor 6. The positive input of the amplifier 40*a* is connected to the junction of the two resistors 52*a* and 54*a*. In this way the potential at the positive terminal is offset from zero to counterbalance an offset arising at the amplifier 40*a* with respect to line 62. Since this offset is related to the magnitude of output of the sensor 6, the connection of the potential divider to the output of the sensors will compensate for variations in the offset.

A second amplifier 40*b* is coupled to the amplifier 30 in the same way as the amplifier 40*a* is coupled to the amplifier 20. Components associated with the amplifier 40*b* similar to those associated with the amplifier 40*a* are similarily referenced but with the subscript b instead of a. The amplifier 40*b* and its associated components operate in a similar manner to the amplifier 40a and its associated components.

It will be appreciated that the signals imposed upon the common line 62 by the two amplifiers 40a and 40b is have substantially the same effect as the signal imposed upon the common line 62 by the amplifier 40 in the system shown in FIG. 1.

Because the function of the amplifier 40 in the system in FIG. 1 is shared by two amplifiers 40a and 40b in FIG. 2 the system is more robust since the failure of one power supply or one of the two amplifiers 40a or 40b will still allow the system to operate.

While the power supply control system described includes only two power supplies connected to a common output terminal it will be appreciated that three or more power supplies can be connected to the common output terminal 10. Each power supply will have its own operational amplifier with the positive input connected to the line 62 and the output connected to a corresponding additional resistor in the summing circuit.

It will be appreciated that if any of the power supplies fails, the corrective signal which the associated amplifier will atttempt to impose on the power supply will be sustained indefinitely. Thus, by comparing the outputs of the amplifiers over a period of time it can soon be determined when a power supply failure has taken place.

The described system offers a number of advantages over previously proposed systems. The control circuitry for each supply can be identical, obviating the need for master and slave arrangements.

The power supplies share the load accurately (better than 1%). The output voltage appearing at the terminal 10 is close to the average output voltage of all the supplies. When the power supplies are of different capacity they are made to share proportionally to their individual capacities. The ability to detect in a simple manner the failure of one of the power supplies to share its load provides a possible advance warning of more serious performance degradation.

In a modification instead of the summing circuits 32, 34, 36 producing an output representing the sum of the error signals produced by the comparators 20, 30, it can produce a signal representative of some other function. For example, by introducing diodes in series with each resistor 32 and 34 the resultant signal produced by the summing circuit can be the most positive or the most negative of the error voltages. This arrangement enables the output voltages of the power supplies to be adjusted for a minimum drop across output series regulators while still achieving a form of balance between the outputs.

While a presently preferred embodiment of the present invention has been illustrated and described, modifications and variations thereof will be apparent to those skilled in the art given the teachings herein, and it is intended that all such modifications and variations be encompassed within the scope of the appended claims.

We claim:

1. A power supply control system for controlling a plurality of variable power supplies feeding a common load each power supply having a control input, the system comprising for each power supply, sensing means connected sense the current drawn from the power supply, first reference means providing a first reference signal, first comparison means having two inputs connected respectively to the sensing means and the first reference means and having an output connected to the control input of the power supply, the first comparing the output of the sensing means with a first reference signal and providing an output to control the power supply in dependence thereon, the system further comprising means for combining the outputs of each first comparison means of each power supply, second reference means providing a second reference signal, and second comparison means having two inputs connected to the combining means and the second reference means respectively, and having an output connected to the first reference means, the second comparison means comparing the output of the combining means with the second reference signal and modifying said first reference signal in response thereto, the system acting in a sense to reduce the difference between the output of the combining means and the second reference signal and the output of each sensing means and the first reference signal substantially to zero.

2. A system according to claim 1, wherein the first reference signal is produced by combining the output of each sensing means and the output of and the second comparison means.

3. A system according to claim 1 wherein each said first comparison means comprises an operational amplifier having first and second inputs, the second input being connected to the output of a corresponding current sensing means via resistive means and also to the output of the second comparison means via resistive means, the first input being connected to the output of the current sensing means via resistive means and to the output of the same operational amplifier by a feedback path comprising the series combination of resistive and capacitive means.

4. A system according to claim 1, wherein said second comparison means comprises an operational amplifier having one input connected to its output by an AC feedback path comprising the series combination of capacitive and resistive means.

5. A system according to claim 4 wherein said one input is also connected to the output of the combining means and the other input is connected to receive a 0 voltage reference signal.

6. A system according to claim 1, wherein said second comparison means comprises a plurality of operational amplifiers equal in number to the number of power supplies and all connected in parallel, each said operational amplifier having one input connected to its output by a DC feedback path comprising resistive means.

7. A system according to claim 6 wherein said one input is also connected to the output of the combining means and the other input is connected to a potential divider connected across a zero voltage reference terminal and the output of a corresponding current sensor.

8. A system according to claim 1, wherein for power supplies of unequal capacity the current sensing means for each supply are scaled so that each sensing means has the same range of variation in output signal whereby to ensure that the power supplies share the load each in proportion to its maximum output capacity.

9. A power supply control system for controlling a plurality of variable power supplies feeding a common load, the system comprising for each power supply, control means having two feedback loops, a first loop with means for comparing (a) the current supplied by the corresponding power supply with (b) the currents supplied by all the other power supplies, and producing an error signal for controlling the corresponding power supply in dependence thereon, and a second loop with means for comparing (a) the error signal with (b) a function of all the error signals produced by all the control means, for modifying the error signal produced in dependence thereon.

10. A system according to claim 9 wherein the second loop includes summing means for summing all the error signals produced by all the control means and a common operational amplifier for comparing the output of the summing means with a reference signal to produce a modifying signal for modifying the signal produced in the first loop and representative of the function of all the currents drawn by all the power supplies.

11. A system according to claim 9 wherein the second loop includes summing means for summing all the error signals produced by all the control means, and a plurality of operational amplifiers equal in number to the number of power supplies, each operational amplifier being connected to compare the output of the summing means with a reference signal to produce a modifying signal to modify the signal produced in the first loop and representative of the function of all the currents drawn by all the power supplies.

12. A system according to claim 11 including means for varying the reference signal supplied to each operational amplifier as a function of the current drawn by the power supply to which the operational amplifier corresponds.

* * * * *